United States Patent
Akatsuka et al.

(10) Patent No.: US 11,891,074 B2
(45) Date of Patent: Feb. 6, 2024

(54) REMOTE DRIVING DEVICE AND REMOTE DRIVING SYSTEM

(71) Applicant: TOYOTA JIDOSHA KABUSHIKI KAISHA, Toyota (JP)

(72) Inventors: Kosuke Akatsuka, Mishima (JP); Toru Takashima, Susono (JP); Satoru Niwa, Shizuoka-ken (JP); Takashi Suzuki, Shizuoka-ken (JP); Rio Suda, Toyota (JP); Hiromitsu Urano, Shizuoka-ken (JP); Sho Otaki, Yokohama (JP); Hiromitsu Kobayashi, Nisshin (JP); Hojung Jung, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 17/570,841

(22) Filed: Jan. 7, 2022

(65) Prior Publication Data
US 2022/0242421 A1 Aug. 4, 2022

(30) Foreign Application Priority Data
Feb. 4, 2021 (JP) ................. 2021-016847

(51) Int. Cl.
*B60W 40/13* (2012.01)
*B60W 40/10* (2012.01)
*G07C 5/00* (2006.01)
*B62D 15/02* (2006.01)

(52) U.S. Cl.
CPC ............ *B60W 40/13* (2013.01); *B60W 40/10* (2013.01); *B62D 15/021* (2013.01); *G07C 5/008* (2013.01); *B60W 2040/1323* (2013.01); *B60W 2040/1353* (2013.01)

(58) Field of Classification Search
CPC ................. B60W 40/13; B60W 40/10; B60W 2040/1323; B60W 2040/1353; B62D 15/021; G07C 5/008
See application file for complete search history.

(56) References Cited

U.S. PATENT DOCUMENTS

| | | | | |
|---|---|---|---|---|
| 3,762,491 A | * | 10/1973 | Meyer | B62D 1/28 180/443 |
| 3,936,955 A | * | 2/1976 | Gruen | G09B 9/048 446/7 |
| 4,830,127 A | * | 5/1989 | Ito | B62D 6/04 701/42 |

(Continued)

FOREIGN PATENT DOCUMENTS

JP 2020-155936 A 9/2020

*Primary Examiner* — Yazan A Soofi
*Assistant Examiner* — Naeem Taslim Alam
(74) *Attorney, Agent, or Firm* — Dinsmore & Shohl LLP

(57) ABSTRACT

A remote driving device configured to remotely operate a vehicle includes a remote operation device, a reaction force unit, a receiver, and a processor. The remote operation device is operated by an operator in order to remotely operate the vehicle. The reaction force unit is configured to generate an operation reaction force to be applied to the remote operation device. The receiver is configured to receive a parameter affecting vehicle characteristics of the vehicle from the vehicle. The processor is configured to control the reaction force unit so as to generate a magnitude of the operation reaction force according to the received parameter.

9 Claims, 7 Drawing Sheets

(56) References Cited

U.S. PATENT DOCUMENTS

| | | | | |
|---|---|---|---|---|
| 5,390,945 | A * | 2/1995 | Orr | B60G 17/005 280/98 |
| 6,113,459 | A * | 9/2000 | Nammoto | A63H 30/02 446/454 |
| 6,338,664 | B1 * | 1/2002 | Wong | A63H 17/12 446/460 |
| 8,299,905 | B2 * | 10/2012 | King | G05D 1/005 340/407.1 |
| 2007/0034041 | A1 * | 2/2007 | Dominguis Botella | F16H 61/24 74/523 |
| 2008/0026671 | A1 * | 1/2008 | Smith | A63H 17/36 446/456 |
| 2008/0103639 | A1 * | 5/2008 | Troy | G05D 1/0027 701/2 |
| 2009/0289778 | A1 * | 11/2009 | King | G05D 1/005 340/407.1 |
| 2011/0172870 | A1 * | 7/2011 | Fudala | G01C 7/04 701/23 |
| 2014/0035736 | A1 * | 2/2014 | Weddle | G06F 3/016 340/407.2 |
| 2014/0214206 | A1 * | 7/2014 | Steinberg | B25J 13/025 700/258 |
| 2014/0240132 | A1 * | 8/2014 | Bychkov | A61B 5/18 340/576 |
| 2015/0343644 | A1 * | 12/2015 | Slawinski | B62D 55/10 701/2 |
| 2019/0308635 | A1 * | 10/2019 | Chase | B60W 50/0098 |
| 2020/0047745 | A1 * | 2/2020 | Suzuki | G08G 1/143 |
| 2020/0130577 | A1 * | 4/2020 | Mitra | G08G 1/052 |
| 2020/0148185 | A1 * | 5/2020 | Poteet | B60T 8/17 |
| 2021/0197802 | A1 * | 7/2021 | Yoon | G06V 20/586 |
| 2021/0221359 | A1 * | 7/2021 | Yamamoto | G08G 1/143 |

\* cited by examiner

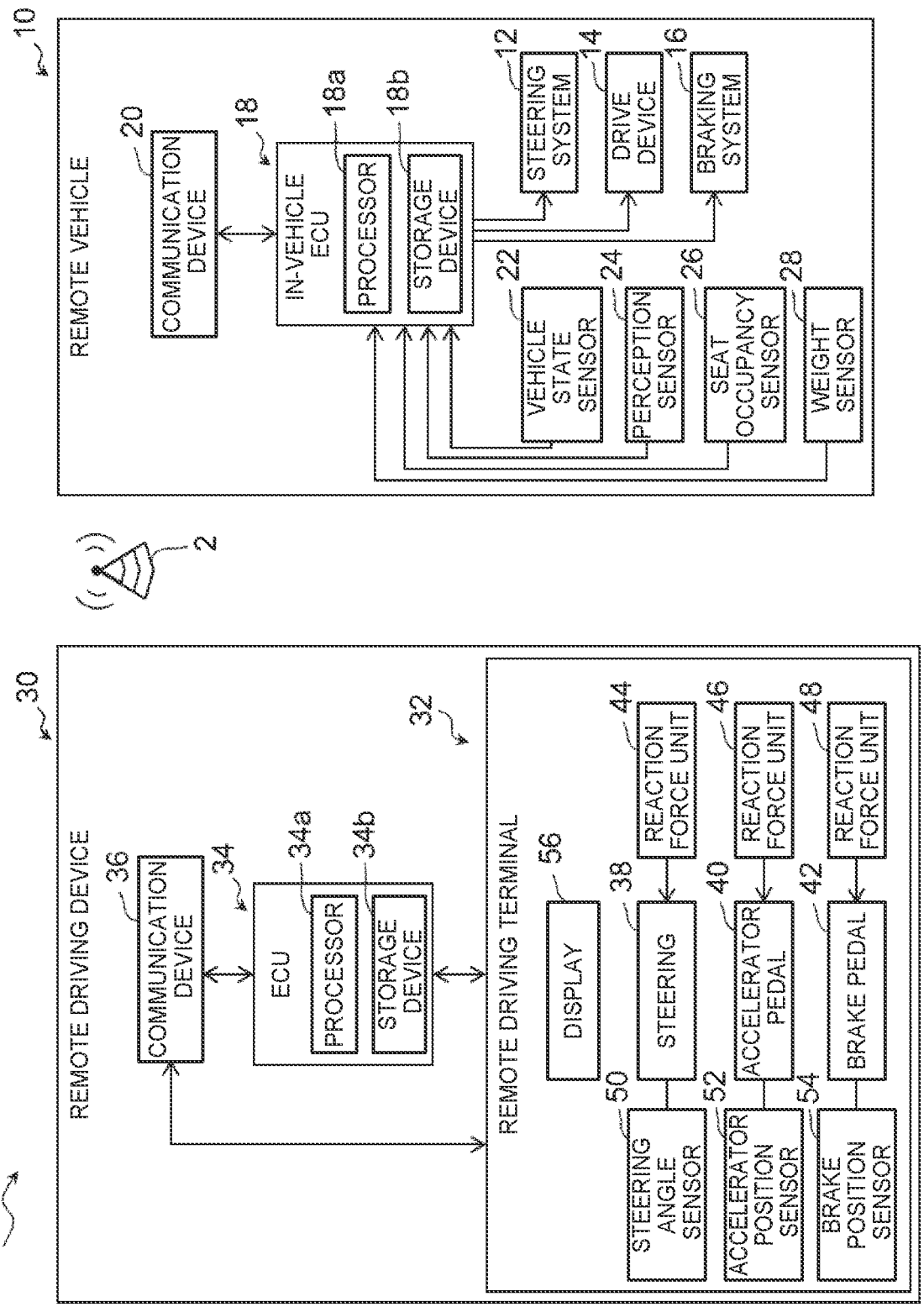

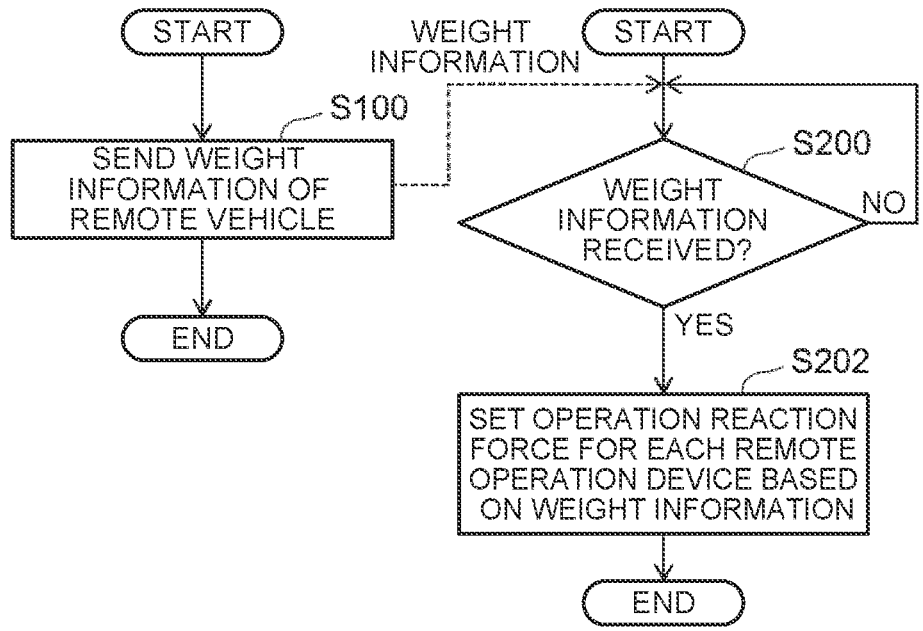
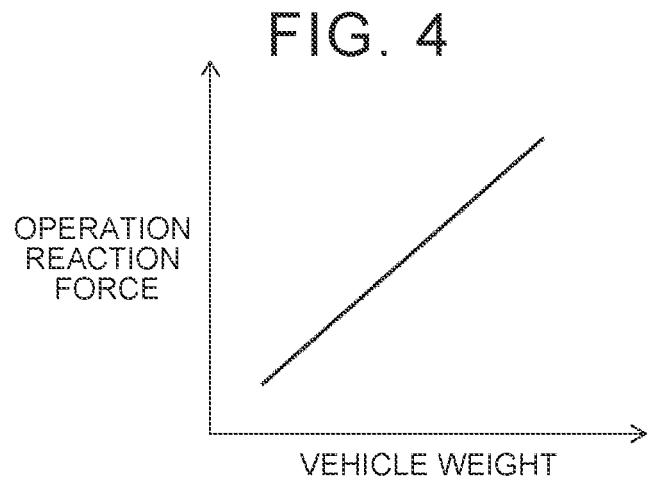
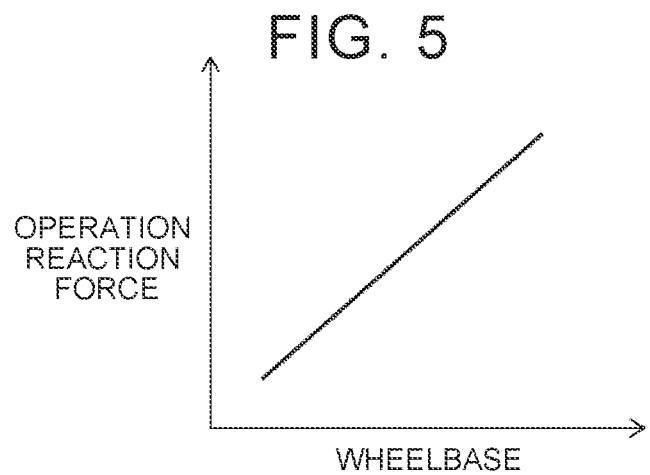

REMOTE DRIVING DEVICE AND REMOTE DRIVING SYSTEM

CROSS-REFERENCE TO RELATED APPLICATION

This application claims priority to Japanese Patent Application No. 2021-016847 filed on Feb. 4, 2021, incorporated herein by reference in its entirety.

BACKGROUND

1. Technical Field

The present disclosure relates to remote driving devices and remote driving systems for vehicles.

2. Description of Related Art

Japanese Unexamined Patent Application Publication No. 2020-155936 (JP 2020-155936 A) discloses a remote driving system for an autonomous vehicle. A steering controller that is used by an operator in order to remotely operate an autonomous vehicle has a driving force function to cause a steering of the steering controller to be subjected to steering resistance (operation reaction force) in response to an external input. Specifically, steering resistance according to the difference in steering angle between the steering of the steering controller and a steering of the autonomous vehicle is applied to the steering of the steering controller.

SUMMARY

For example, vehicles to be remotely operated have different vehicle characteristics depending on the vehicle weight. As a result, an operator who remotely operates a vehicle gets a different operational feel depending on the weight of the vehicle. Therefore, when the same operation reaction force is applied to a remote operation device when the operator remotely operates a vehicle whose parameter affecting the vehicle characteristics such as vehicle weight is different, it may be difficult for the operator to appropriately get an operational feel of the vehicle.

The present disclosure was made in view of the above problem and provides a remote driving device and a remote driving system that allow an operator to remotely drive a vehicle with a feel close to the feel a driver gets when actually riding in and driving the vehicle, regardless of the differences among vehicles to be remotely operated.

A first aspect of the present disclosure relates to a remote driving device configured to remotely operate a vehicle. The remote driving device includes a remote operation device, a reaction force unit, a receiver, and a processor. The remote operation device is configured to be operated by an operator to remotely operate the vehicle. The reaction force unit is configured to generate an operation reaction force to be applied to the remote operation device. The receiver is configured to receive a parameter affecting vehicle characteristics of the vehicle from the vehicle. The processor is configured to control the reaction force unit so as to generate a magnitude of the operation reaction force according to the received parameter.

In the remote driving device of the first aspect, the parameter may include a weight of the vehicle. The processor may be configured to control the reaction force unit so as to generate a greater operation reaction force when the weight is large than when the weight is small.

In the remote driving device of the first aspect, the parameter may include a wheelbase of the vehicle. The processor may be configured to control the reaction force unit so as to generate a greater operation reaction force when the wheelbase is long than when the wheelbase is short.

In the remote driving device of the first aspect, the parameter may include a tread of the vehicle. The processor may be configured to control the reaction force unit so as to generate a greater operation reaction force when the tread is large than when the tread is small.

In the remote driving device of the first aspect, the parameter may include the number of occupants in the vehicle. The processor may be configured to control the reaction force unit so as to generate a greater operation reaction force when the number of occupants is large than when the number of occupants is small.

In the remote driving device of the first aspect, the parameter may include a weight of a load carried by the vehicle. The processor may be configured to control the reaction force unit so as to generate a greater operation reaction force when the weight of the load is large than when the weight of the load is small.

In the remote driving device of the first aspect, the processor may be configured to control the reaction force unit so as to generate a greater operation reaction force when an abnormality related to traveling of the vehicle has occurred in the vehicle than when the abnormality is not present in the vehicle.

In the remote driving device of the first aspect, the remote operation device may be at least one of the following components: a steering, an accelerator pedal, and a brake pedal.

A second aspect of the present disclosure relates to a remote driving system including a vehicle and a remote driving device that is configured to remotely operate the vehicle. The vehicle includes a transmitter that sends a parameter affecting vehicle characteristics of the vehicle to the remote driving device. The remote driving device includes a remote operation device, a reaction force unit, a receiver, and a processor. The remote operation device is configured to be operated by an operator to remotely operate the vehicle. The reaction force unit is configured to generate an operation reaction force to be applied to the remote operation device. The receiver is configured to receive the parameter from the vehicle. The processor is configured to control the reaction force unit so as to generate a magnitude of the operation reaction force according to the received parameter.

In the remote driving system of the second aspect, the vehicle may include a processor that is configured to determine whether the vehicle is being driven remotely. The processor may be configured to perform control in which a steering gear ratio of the vehicle is fixed while the vehicle is being driven remotely. The processor may be configured to perform control in which the steering gear ratio is made variable while the vehicle is not being driven remotely.

According to the remote driving device of the first aspect or the remote driving system of the second aspect according to the present disclosure, a magnitude of the operation reaction force according to the parameter affecting the vehicle characteristics is applied to the remote operation device operated by the operator. Accordingly, the operator can remotely drive the vehicle with a feel close to the feel a driver gets when actually riding in and driving the vehicle, regardless of the differences among vehicles to be remotely operated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram showing an example of a configuration of a remote driving system according to a first embodiment of the present disclosure;

FIG. 3 is a flowchart showing an example of a process flow for setting operation reaction forces according to the first embodiment;

FIG. 4 is a graph showing an example of the relationship between the operation reaction force and the weight of a remote vehicle;

FIG. 5 is a graph showing an example of the relationship between the operation reaction force and the wheelbase of the remote vehicle;

DETAILED DESCRIPTION OF EMBODIMENTS

Figure 2A:
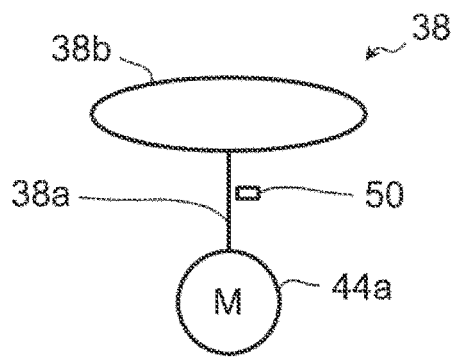
FIG. 2A shows a specific configuration around a steering shown in FIG. 1.

It should be understood that even when the number, quantity, amount, range, etc. of an element is mentioned in the following description of embodiments, the present disclosure is not limited to the mentioned numerical values unless otherwise specified or unless clearly limited to the mentioned numerical values in principle. The structures, steps, etc. described in each of the following embodiments are not necessary to the present disclosure unless otherwise specified.

A first embodiment of the present disclosure will be described. First, an example of a configuration of a remote driving system will be described. FIG. 1 is a block diagram showing an example of a configuration of a remote driving system 1 according to the first embodiment. The remote driving system 1 includes a vehicle to be remotely operated (hereinafter simply referred to as the "remote vehicle") 10 and a remote driving device 30 that remotely operates the remote vehicle 10.

The remote vehicle 10 includes a steering system 12, a drive device 14, a braking system 16, an in-vehicle electronic control unit (in-vehicle ECU) 18, a communication device 20, a vehicle state sensor 22, and a perception sensor 24. The remote vehicle 10 is, for example, an autonomous vehicle. Examples of the remote vehicle 10 include automobiles of various sizes and weights (e.g., passenger car, truck, and bus).

The steering system 12 steers wheels of the remote vehicle 10. The drive device 14 generates a driving force for the remote vehicle 10. The drive device 14 is, for example, an internal combustion engine. The braking system 16 generates a braking force for the remote vehicle 10. More specifically, as an example, all of the steering system 12, the drive device 14, and the braking system 16 are of a by-wire type. Therefore, the steering system 12 includes a steering mechanism (e.g., electric steering mechanism) that is mechanically separated from a steering wheel. The drive device 14 includes an electronically controlled throttle. Another example of the by-wire type drive device 14 is a vehicle traction electric motor. The braking system 16 is an electronically controlled brake (ECB).

The in-vehicle ECU 18 is a computer that controls the remote vehicle 10. Specifically, the in-vehicle ECU 18 includes a processor 18a and a storage device 18b. The processor 18a performs various processes. The storage device 18b has various kinds of information stored therein. Examples of the storage device 18b include a volatile memory, a non-volatile memory, a hard disk drive (HDD), and a solid state drive (SSD). The in-vehicle ECU 18 (processor 18a) implements the various processes by executing various computer programs. The various programs are stored in the storage device 18b or recorded on a computer-readable recording medium. There may be more than one processor 18a and more than one storage device 18b.

The communication device 20 communicates with the remote driving device 30 via a wireless communication network 2. The vehicle state sensor 22 detects the state of the remote vehicle 10. Examples of the vehicle state sensor 22 include a vehicle speed sensor (wheel speed sensor), a steering angle sensor, a yaw rate sensor, and a lateral acceleration sensor. The perception sensor 24 perceives (detects) the surroundings of the remote vehicle 10. Examples of the perception sensor 24 include a camera, a Laser Imaging Detection and Ranging (LIDAR), and a radar.

The remote driving device 30 includes a remote driving terminal 32, an electronic control unit (ECU) 34, and a communication device 36. The remote driving terminal 32 includes a steering 38, an accelerator pedal 40, and a brake pedal 42 as remote operation devices that are operated by an operator to remotely operate the remote vehicle 10.

The remote driving terminal 32 includes a reaction force unit 44 that applies an operation reaction force to the steering 38. More specifically, the reaction force unit 44 is configured to apply an operation reaction force to the operation of the steering 38 performed by the operator so that the operator who remotely operates the remote vehicle 10 can get an operational feel of the remote vehicle 10 via the steering 38. The remote driving terminal 32 includes similar reaction force units 46 and 48 for the accelerator pedal 40 and the brake pedal 42, respectively.

Figure 2B:
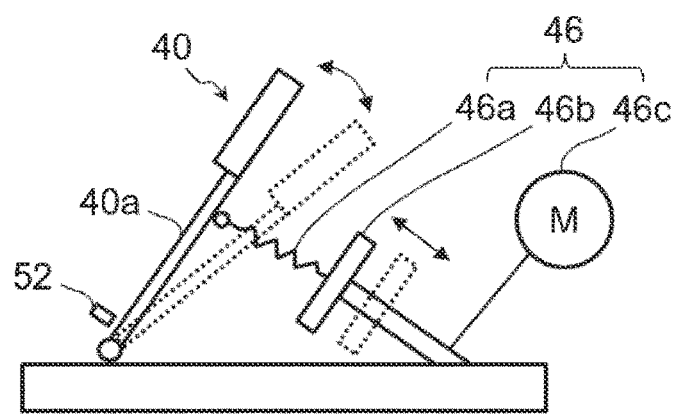
FIG. 2B shows a specific configuration around an accelerator pedal shown in FIG. 1.
Figure 2C:
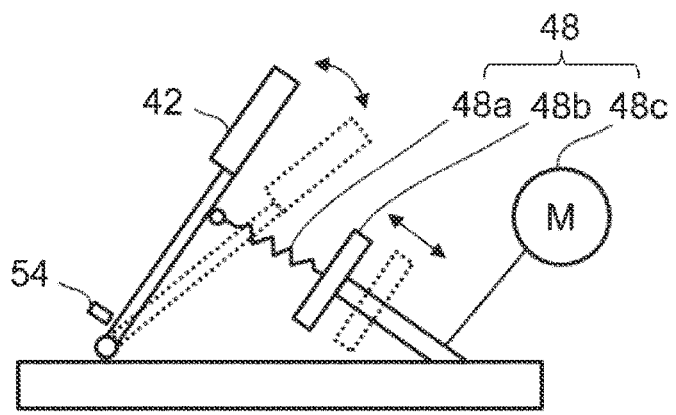
FIG. 2C shows a specific configuration around a brake pedal shown in FIG. 1.

FIGS. 2A to 2C show examples of configurations around the steering 38, the accelerator pedal 40, and brake pedal 42 shown in FIG. 1, respectively. First, as shown in FIG. 2A, the reaction force unit 44 for the steering 38 includes, for example, a reaction motor 44a coupled to a steering wheel 38b via a steering shaft 38a. The ECU 34 controls the magnitude of the operation reaction force that is generated by the reaction motor 44a. The reaction force unit 44 can thus change the operation reaction force (steering reaction force) as desired. The steering shaft 38a is provided with a steering angle sensor 50. The steering angle sensor 50 outputs a signal according to the rotation angle of the steering wheel 38b, that is, the steering angle (operation amount), to the communication device 36. The output signal of the steering angle sensor 50 may be sent to the communication device 36 via the ECU 34 (the same applies to an accelerator position sensor 52 and a brake position sensor 54 that will be described later).

As shown in FIG. 2B, the reaction force unit 46 for the accelerator pedal 40 includes, as an example, a return spring 46a, a slide member 46b, and a reaction motor 46c. The return spring 46a is interposed between a pedal arm 40a of the accelerator pedal 40 and the slide member 46b. The slide member 46b is a base that receives a depressing force applied to the accelerator pedal 40. The accelerator pedal 40 shown by a solid line corresponds to a basic state in which the operator is not depressing the accelerator pedal 40. When the accelerator pedal 40 is depressed, the return spring 46a is compressed and generates a depression reaction force. The slide member 46b is slidable so as to change the length of the return spring 46a in the basic state, when driven by the reaction motor 46c.

When the length of the return spring 46a in the basic state is reduced, a greater operation reaction force is generated for the same depression amount of the accelerator pedal 40. The reaction force unit 46 can therefore change the operation reaction force (depression reaction force) as desired by changing the length of the return spring 46a by the reaction motor 46c that is controlled by the ECU 34. The accelerator pedal 40 is provided with the accelerator position sensor 52. The accelerator position sensor 52 outputs a signal according to the depression amount (operation amount) of the accelerator pedal 40 to the communication device 36.

As shown in FIG. 2C, the reaction force unit 48 for the brake pedal 42 includes, for example, a return spring 48a, a slide member 48b, and a reaction motor 48c. The reaction force unit 48 is configured in a manner similar to that of the reaction force unit 46 described above. The reaction force unit 48 can therefore change an operation reaction force (depression reaction force) as desired by changing the length of the return spring 48a by the reaction motor 48c that is controlled by the ECU 34. The brake pedal 42 is provided with the brake position sensor 54. The brake position sensor 54 outputs a signal according to the depression amount (operation amount) of the brake pedal 42 to the communication device 36.

The remote driving terminal 32 further includes a display 56. The display 56 is used to remotely operate the remote vehicle 10 by the operator. The display 56 displays, for example, an image of an area ahead of the remote vehicle 10 captured by the camera (perception sensor 24) of the remote vehicle 10.

The ECU 34 is a computer that performs processes related to the remote driving device 30. Specifically, the ECU 34 includes a processor 34a and a storage device 34b. The processor 34a performs various processes related to remotely operating the remote vehicle 10 by the remote driving terminal 32. The storage device 34b has various kinds of information stored therein. Specific examples of the storage device 34b are similar to those of the storage device 18b described above. The ECU 34 (processor 34a) implements the various processes by executing various computer programs. The various programs are stored in the storage device 34b or recorded on a computer-readable recording medium. There may be more than one processor 34a and more than one storage device 34b.

More than one remote driving terminal 32 may be connected to the ECU 34. That is, the ECU 34 may have a function as a server that manages the plurality of remote driving terminals 32.

The communication device 36 communicates with the remote vehicle 10 via the wireless communication network 2. Specifically, when the remote driving device 30 remotely operates the remote vehicle 10, the communication device 36 sends the operation amounts (steering angle, depression amount of the accelerator pedal 40, and depression amount of the brake pedal 42) detected by the sensors (the steering angle sensor 50, the accelerator position sensor 52 and the brake position sensor 54) to the remote vehicle 10. The in-vehicle ECU 18 controls the steering system 12, the drive device 14, and the braking system 16 based on the operation amounts received from the remote driving device 30. The communication device 36 also receives various kinds of data from the remote vehicle 10. As used herein, the various kinds of data (various kinds of information) include image data of the camera to be displayed on the display 56, and data on a "parameter affecting vehicle characteristics" of the remote vehicle 10 that will be described later.

Next, setting of the operation reaction forces will be described. When the weight of the vehicle to be remotely operated is different, the vehicle characteristics are also different, and as a result, the operational feel the operator who remotely operates the vehicle will get is also different. In view of this point, in the present embodiment, the operation reaction forces that are applied to the remote operation devices (the steering 38, the accelerator pedal 40, and the brake pedal 42) are set to magnitudes according to the vehicle weight. The vehicle weight is an example of the "parameter affecting vehicle characteristics."

FIG. 3 is a flowchart showing an example of a process flow for setting the operation reaction forces according to the first embodiment. The process of this flowchart is performed before the operator starts remotely operating the remote vehicle 10 when a condition for the operator to start remotely operating the remote vehicle 10 is satisfied.

First, processing on the remote vehicle 10 side will be described. When the routine is started, it proceeds to step S100, and the processor 18a of the in-vehicle ECU 18 sends weight information of the remote vehicle 10 to the remote driving device 30 via the communication device 20. The processing on the remote vehicle 10 side is thus ended. The weight of the remote vehicle 10 (more specifically, for example, complete vehicle curb weight) is a value stored in advance in the storage device 18b. The communication device 20 is an example of the "transmitter" according to the present disclosure.

Next, processing on the remote driving device 30 side will be described. When the routine is started, it proceeds to step S200, and the processor 34a of the ECU 34 of the remote driving device 30 determines whether the communication device 36 has received the weight information from the remote vehicle 10. When the communication device 36 has received the weight information, the routine proceeds to step S202. The communication device 36 is an example of the "receiver" according to the present disclosure.

In step S202, the processor 34a sets the operation reaction forces for the remote operation devices (the steering 38, the accelerator pedal 40, and the brake pedal 42) based on the received weight information. The processing on the remote driving device 30 side is thus ended. FIG. 4 is a graph showing an example of the relationship between the operation reaction force and the weight of the remote vehicle 10. In FIG. 4, the operation reaction force is set so that the operation reaction force increases with an increase in vehicle weight. More specifically, the value of the operation reaction force for the same vehicle weight basically varies among the remote operation devices (the steering 38, the accelerator pedal 40, and the brake pedal 42). However, for all of the remote operation devices (the steering 38, the accelerator pedal 40, and the brake pedal 42), the operation reaction force increases with an increase in vehicle weight, as shown in FIG. 4. The same applies to FIGS. 5 to 8 that will be described later.

The storage device 34b has stored therein, for example, the relationship between the operation reaction force and the vehicle weight shown in FIG. 4 as a map for each of the remote operation devices (the steering 38, the accelerator pedal 40, and the brake pedal 42). The processor 34a calculates, for each of the remote operation devices (the steering 38, the accelerator pedal 40, and the brake pedal 42), the operation reaction force according to the vehicle weight received from the remote vehicle 10 based on such a map. The processor 34a sets the operation reaction forces for the remote operation devices (the steering 38, the accelerator pedal 40, and the brake pedal 42) that are to be used after the start of remote driving to the values thus calculated. Accordingly, the reaction force units 44, 46, and 48 can apply the magnitude of the operation reaction forces according to the vehicle weight received from the remote vehicle 10 to the remote operation devices (the steering 38, the accelerator pedal 40, and the brake pedal 42), respectively.

In the example shown in FIG. 4, the operation reaction force increases linearly with an increase in vehicle weight. However, the relationship between the vehicle weight and the operation reaction force need only be set so that the operation reaction force is greater when the vehicle weight is large than when the vehicle weight is small. Therefore, the relationship between the vehicle weight and the operation reaction force may be set so that the operation reaction force increases curvedly with an increase in vehicle weight or so that the operation reaction force increases stepwise in any number of steps with an increase in vehicle weight.

Next, effects of the first embodiment will be described. According to the first embodiment described above, the remote driving device 30 receives weight information from the remote vehicle 10 and sets the operation reaction forces for the remote operation devices (the steering 38, the accelerator pedal 40, and the brake pedal 42) based on the received weight information. The received vehicle weight is an example of the parameter affecting vehicle characteristics. The operator who remotely operates the remote vehicle 10 can estimate the vehicle characteristics from the operational feel of the remote vehicle 10 the operator gets via the remote operation devices (the steering 38, the accelerator pedal 40, and the brake pedal 42) to which the operation reaction forces set as described above have been applied. In other words, setting the operation characteristics (reaction force characteristics) according to the vehicle weight can assist the operator in finding out the characteristics of the remote vehicle 10. As described above, according to the first embodiment, the operator can remotely drive the vehicle with a feel close to the feel a driver gets when actually riding in and driving the vehicle, regardless of the differences among vehicles to be remotely operated.

In the first embodiment, the operation reaction forces are set so that the operation reaction forces are greater when the weight of the remote vehicle 10 is large than when the weight of the remote vehicle 10 is small. Accordingly, in an example in which the remote vehicle 10 is a vehicle with a large weight such as truck, operation characteristics with a large operation reaction force are obtained as operation characteristics of the remote operation devices (the steering 38, the accelerator pedal 40, and the brake pedal 42). The operator can therefore recognize that he or she is remotely driving a vehicle with a large weight. In this example, since the operation characteristics with a large operation reaction force are provided, the user is less likely to make a sudden operation request to a vehicle with a large weight (that is, an excessive operation is less likely to occur). On the other hand, in an example in which the remote vehicle 10 is a vehicle with a small weight such as what is called "Kei car" (Japanese category for very small vehicles), operation characteristics with a small operation reaction force are obtained as the operation characteristics of the remote operation devices (the steering 38, the accelerator pedal 40, and the brake pedal 42). The operator can therefore recognize that he or she is remotely driving a vehicle with a small weight.

Next, other examples of setting the operation reaction forces will be described. The "parameter affecting vehicle characteristics" that is sent to the remote driving device 30 in order to set the operation reaction forces is not limited to the vehicle weight. For example, the "parameter affecting vehicle characteristics" may be the wheelbase, the tread, the number of occupants, or the load weight of the remote vehicle 10 that will be described below. The examples using these parameters have similar effects to those of the example using the vehicle weight. The operation reaction forces may be set based on, for example, two or more of these parameters: vehicle weight, wheelbase, tread, number of occupants, and load weight.

FIG. 5 is a graph showing an example of the relationship between the operation reaction force and the wheelbase of the remote vehicle 10. As shown in FIG. 5, the operation reaction force may be set so that the operation reaction force is greater when the wheelbase is long than when the wheelbase is short. In this example, wheelbase information stored in the storage device 18b of the remote vehicle 10 is sent to the remote driving device 30.

Figure 6:
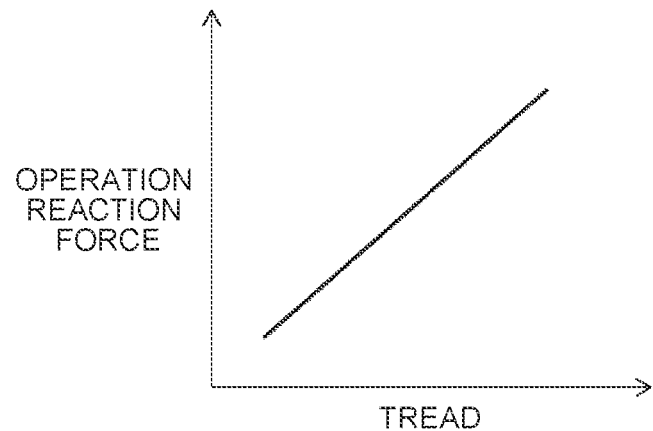
FIG. 6 is a graph showing an example of the relationship between the operation reaction force and the tread of the remote vehicle.

FIG. 6 is a graph showing an example of the relationship between the operation reaction force and the tread of the remote vehicle 10. As shown in FIG. 6, the operation reaction force may be set so that the operation reaction force is greater when the tread is large than when the tread is small. In this example, tread information stored in the storage device 18b of the remote vehicle 10 is sent to the remote driving device 30. In an example in which the remote vehicle 10 is a four-wheeled vehicle, the tread information may be either information on a front tread or information on a rear tread, or may be information on the average of the front and rear treads.

Figure 7:
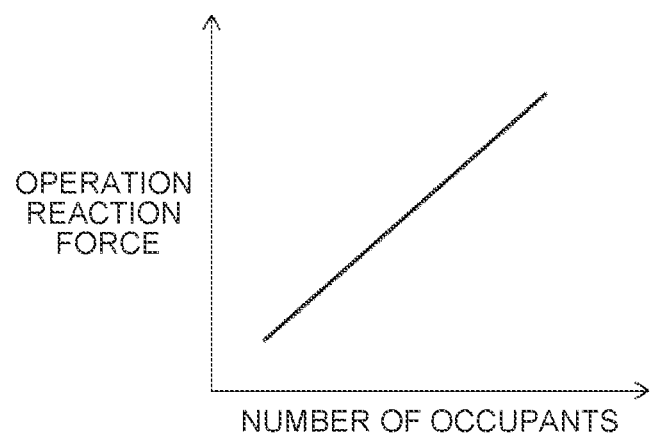
FIG. 7 is a graph showing an example of the relationship between the operation reaction force and the number of occupants in the remote vehicle.

FIG. 7 is a graph showing an example of the relationship between the operation reaction force and the number of occupants in the remote vehicle 10. As shown in FIG. 7, the operation reaction force may be set so that the operation reaction force is greater when the number of occupants is large than when the number of occupants is small. The number of occupants can be detected by, for example, the in-vehicle ECU 18 that uses seat occupancy sensors 26 mounted in each seat of the remote vehicle 10. Alternatively, in an example in which the remote vehicle 10 has a camera that captures an image of the inside of a vehicle cabin of the remote vehicle 10, the in-vehicle ECU 18 may detect the number of occupants using the image data of the camera. The in-vehicle ECU 18 sends information on the detected number of occupants to the remote driving device 30 via the communication device 20. In an example in which the remote vehicle 10 is a vehicle such as a bus with a crew member on board, the number of passengers counted by the crew member may be sent to the remote driving device 30 via a Human Machine Interface (HMI) device and the communication device 20.

Figure 8:
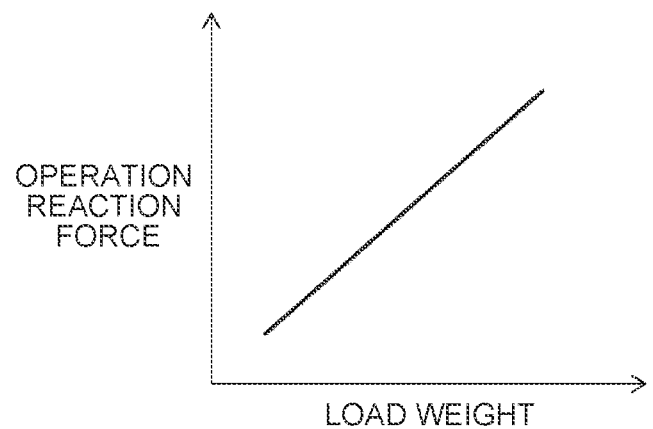
FIG. 8 is a graph showing an example of the relationship between the operation reaction force and the load weight of the remote vehicle.

FIG. 8 is a graph showing an example of the relationship between the operation reaction force and the load weight of the remote vehicle 10. As used herein, the load weight referred to the weight of loads carried by the remote vehicle 10. As shown in FIG. 8, the operation reaction force may be set so that the operation reaction force is greater when the load weight is large than when the load weight is small. The load weight can be detected by, for example, the in-vehicle ECU 18 that uses a weight sensor 28 mounted in a luggage compartment of the remote vehicle 10. The in-vehicle ECU 18 sends information on the detected load weight to the remote driving device 30 via the communication device 20.

Next, other examples of the configuration of the remote driving device (remote driving terminal) will be described. The remote driving device 30 including all of the steering 38, the accelerator pedal 40, and the brake pedal 42 as the "remote operation devices" is illustrated in the first embodiment. Instead of such an example, the remote driving device (remote driving terminal) may include only one or two of the remote operation devices: the steering 38, the accelerator pedal 40, and the brake pedal 42.

The setting of the operation reaction forces according to the "parameter affecting vehicle characteristics" may be applied to one or two of the remote operation devices: the steering 38, the accelerator pedal 40, and the brake pedal 42. The remote operation device for remotely operating the steering is not necessarily limited to the steering (steering wheel), and may be, for example, a joystick.

A second embodiment of the present disclosure will be described. As in the first embodiment, in the second embodiment as well, the operation reaction forces for the remote operation devices (the steering 38, the accelerator pedal 40, and the brake pedal 42) are set according to the "parameter affecting vehicle characteristics (e.g., vehicle weight)." In addition, in the second embodiment, greater operation reaction forces are applied to the remote operation devices (the steering 38, the accelerator pedal 40, and the brake pedal 42) when an abnormality related to traveling of the vehicle has occurred in the remote vehicle 10 than when there is no such abnormality in the remote vehicle 10.

Figure 9:
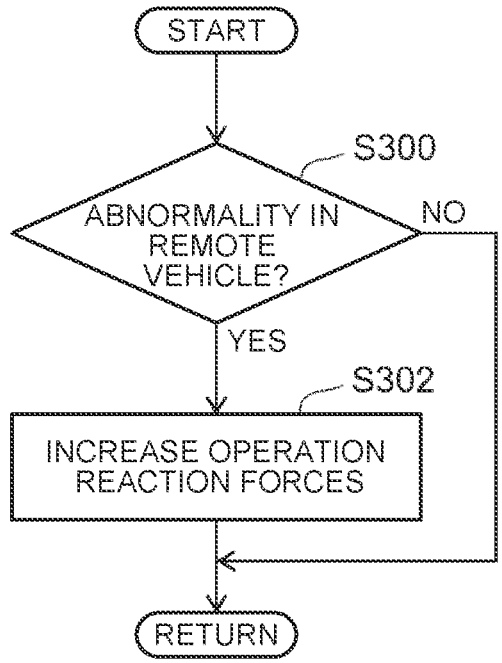
FIG. 9 is a flowchart showing an example of a process for setting operation reaction forces when an abnormality occurs in a vehicle according to a second embodiment of the present disclosure.

FIG. 9 is a flowchart showing an example of a process for setting the operation reaction forces when an abnormality occurs in the remote vehicle 10 according to the second embodiment of the present disclosure. The process of this flowchart is performed, for example, in association with the process of the flowchart shown in FIG. 3 described above while the operator remotely driving the remote vehicle 10.

In FIG. 9, when the routine is started, it proceeds to step S300, and the processor 34a of the remote driving device 30 determines whether an abnormality related to traveling of the vehicle has occurred in the remote vehicle 10. Specifically, when an abnormality related to traveling of the vehicle has occurred in the remote vehicle 10, the remote vehicle 10 having detected the abnormality sends abnormality occurrence information to the remote driving device 30. For example, the processor 34a determines in step S300 whether an abnormality related to traveling of the vehicle has occurred in the remote vehicle 10, based on whether such abnormality occurrence information has been received.

The abnormality related to traveling of the vehicle is, for example, a decrease in driving force of an electric motor that is provided in a steering operation mechanism of the steering system 12 in order to steer the wheels. Another example of such an abnormality is a decrease in vehicle driving force of the drive device 14 due to, for example, a malfunction of the electronically controlled throttle, or a decrease in braking force of the braking system 16 due to, for example, a malfunction of the electronically controlled brake.

When there is no such abnormality in step S300, the processor 34a ends the current process. On the other hand, when such an abnormality has occurred in step S300, the routine proceeds to step S302.

In step S302, for example, the processor 34a controls the reaction force units 44, 46, and 48 so as to increase the operation reaction forces for the remote operation devices (the steering 38, the accelerator pedal 40, and the brake pedal 42) by a predetermined value as compared to the case where there is no such abnormality. The processor 34a then returns to the start of the routine and performs control. The remote operation devices whose operation reaction forces are increased in response to the occurrence of such an abnormality in the remote vehicle 10 need not necessarily be all of the remote operation devices 38, 40, and 42 as in the example of step S302. For example, only the operation reaction force of the remote operation device associated with the abnormality that has occurred may be increased. For example, when an abnormality has occurred in the steering system 12, the reaction force unit 44 may be controlled so that the operation reaction force for the steering 38 is increased but the operation reaction forces for the accelerator pedal 40 and the brake pedal 42 will not be changed.

As described above, according to the second embodiment, an abnormality in the remote vehicle 10 is reflected in the setting of the operation reaction forces. As a result, occurrence of an abnormality in the remote vehicle 10 can be conveyed to the operator through the operational feel of the remote operation devices 38, 40, and 42. Increasing the operation reaction forces when an abnormality has occurred can alert the operator to be careful so that the operation amounts will not become too large.

Next, reference examples for the first embodiment and the second embodiment of the present disclosure will be described. These reference examples relate to a vehicle to be remotely operated (remote vehicle) having a configuration that allows an operator who remotely operates a remove vehicle to drive individual remote vehicles with equal operation characteristics regardless of the differences among the remote vehicles.

A first reference example (vehicle weight) will be described. First, in the first reference example, a vehicle having a configuration that allows the operator to remotely drive individual vehicles with equal operation characteristics regardless of the difference in vehicle weight will be described. This vehicle has the following technical features. "This vehicle is a vehicle included in a vehicle group that is remotely operated by an operator who operates a remote operation device. An own vehicle that is the vehicle includes a steering system, a drive device, and a braking system. The own vehicle is configured to select, regarding an output characteristic of at least one of the steering system, the drive device, and the braking system in response to an operation input, a different output characteristic for remote driving by the operator from an output characteristic that is selected for non-remote driving by a driver riding in the own vehicle or an autonomous driving system. When the output characteristic selected for the remote driving of the own vehicle is compared with the output characteristic selected for remote driving of another vehicle included in the vehicle group, the ratio of an output of the at least one of the steering system, the drive device, and the braking system to an operation input in the own vehicle is higher than the ratio of an output of the at least one of the steering system, the drive device, and the braking system to an operation input in the another vehicle when the weight of the own vehicle is larger than the weight of the another vehicle."

Next, a specific example of the vehicle having the above technical features will be described with reference to the remote driving system 1 and the remote vehicle 10 included in the remote driving system 1 shown in FIGS. 1 and 2A to 2C.

In the first reference example, the remote vehicle 10 is one of the vehicles included in the vehicle group that is remotely operated by the operator who operates the remote operation devices (the steering 38, the accelerator pedal 40, and the brake pedal 42). The remote vehicle 10 (own vehicle) includes the steering system 12, the drive device 14, and the braking system 16.

In the first reference example, the remote vehicle 10 (own vehicle) is configured to select, regarding the output characteristic of each of the steering system 12, the drive device 14, and the braking system 16, a different output characteristic for remote driving by the operator from an output characteristic that is selected for non-remote driving by a driver riding in the remote vehicle 10 or an autonomous driving system.

Figure 10:
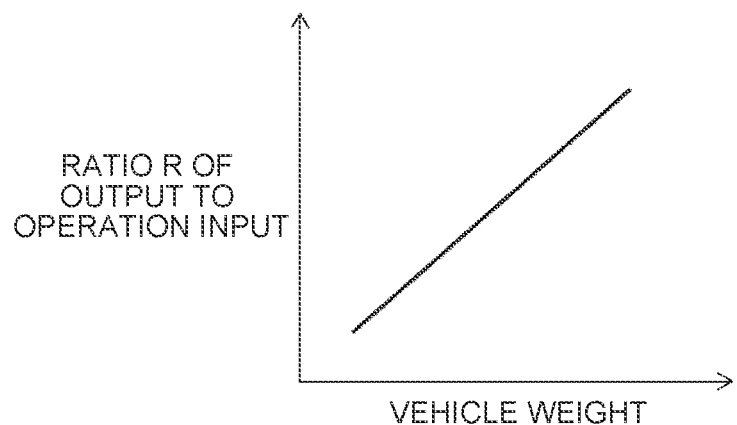
FIG. 10 is a graph showing the relationship between the output characteristic that is selected for remote driving and the vehicle weight in a first reference example for the first and second embodiments of the present disclosure.
Figure 11:
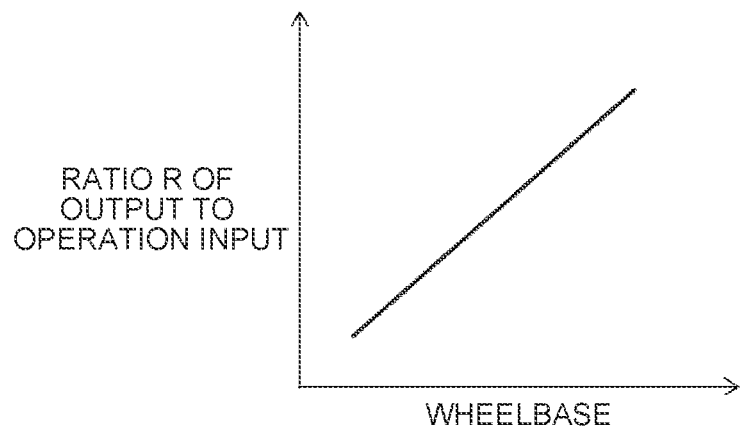
FIG. 11 is a graph showing the relationship between the output characteristic that is selected for remote driving and the wheelbase in a second reference example.

FIG. 10 is a graph showing the relationship between the output characteristic that is selected for the remote driving and the vehicle weight in the first reference example. FIG. 10 shows setting of the output characteristic (that is, the ratio R of an output to an operation input) for the vehicle group that is to be remotely operated and that includes the remote vehicle 10 (own vehicle). According to the setting shown in FIG. 10, the ratio R is higher in a vehicle with a large vehicle weight in the vehicle group than in a vehicle with a small vehicle weight in the vehicle group. In other words, when the output characteristic of the remote vehicle 10 (own vehicle) is compared with the output characteristic of another vehicle included in the vehicle group, the ratio R in the own vehicle is higher than the ratio R in the another vehicle when the weight of the own vehicle is larger than the weight of the another vehicle.

Specifically, for the steering system 12, the ratio of the turning angle of the wheels (tires) to the rotation angle (steering angle) of the steering wheel 38b (steering gear ratio) is an example of the ratio R. Accordingly, such an output characteristic that the turning angle of the wheels changes more significantly for the same steering angle that is made by the operator (what is called a quicker output characteristic) is obtained in a vehicle with a large vehicle weight than in a vehicle with a small vehicle weight.

For the drive device 14, the ratio of the output of the drive device 14 (e.g., engine torque) to the depression amount of the accelerator pedal 40 is another example of the ratio R. Accordingly, such an output characteristic that the engine torque changes more significantly for the same depression amount of the accelerator pedal 40 by the operator is obtained in a vehicle with a large vehicle weight than in a vehicle with a small vehicle weight.

For the braking system 16, the ratio of the output of the braking system 16 (e.g., braking force) to the depression amount of the brake pedal 42 is still another example of the ratio R. Accordingly, such an output characteristic that the braking force changes more significantly for the same depression amount of the brake pedal 42 by the operator is obtained in a vehicle with a large vehicle weight than in a vehicle with a small vehicle weight.

As described above, according to the first reference example, in each vehicle (remote vehicle 10) included in the vehicle group that is to be remotely operated, a different ratio R (i.e., output characteristic) is set as the output characteristic for remote driving according to the vehicle weight as shown in FIG. 10. Therefore, the operator can remotely drive each vehicle to be remotely operated with equal operation characteristics (operational feel) regardless of the difference in vehicle characteristics due to the difference in vehicle weight. It is also possible to obtain the output characteristic suitable for remote driving.

Unlike the above example, such setting of the output characteristic as shown in FIG. 10 may be applied to one or two of the remote operation devices: the steering 38, the accelerator pedal 40, and the brake pedal 42. In an example in which there is more than one remote driving terminal 32 that remotely operates the vehicle group, the output characteristic for remote driving of each vehicle may be associated with the individual remote driving terminals 32 and may be set to a different value for each remote driving terminal 32. In an example in which there is more than one operator who remotely operates the vehicle group, the output characteristic for remote driving of each vehicle may be associated with the individual operators and may be set to a different value for each operator.

Next, a second reference example (wheelbase), a third reference example (tread), a fourth reference example (number of occupants), and a fifth reference example (load weight) will be described with reference to FIGS. 11 to 14. The following description will be given regarding the differences from the first reference example.

In the second to fifth reference examples, the phrase "when the weight of the own vehicle is larger than the weight of the another vehicle" in the technical features of the first reference example is replaced with "when the wheelbase of the own vehicle is longer than the wheelbase of the another vehicle," "when the tread of the own vehicle is greater than the tread of the another vehicle," "when the number of occupants in the own vehicle is larger than the number of occupants in the another vehicle," and "when the weight of loads carried by the own vehicle is larger than the weight of loads carried by the another vehicle," respectively.

FIGS. 11 to 14 are graphs showing the relationship between the output characteristic that is selected for remote driving and the wheelbase, the tread, the number of occupants, and the load weight in the second to fifth reference examples, respectively. According to the setting shown in FIG. 11, the ratio R is higher in a vehicle with a long wheelbase in the vehicle group than in a vehicle with a short wheelbase in the vehicle group.

Figure 12:
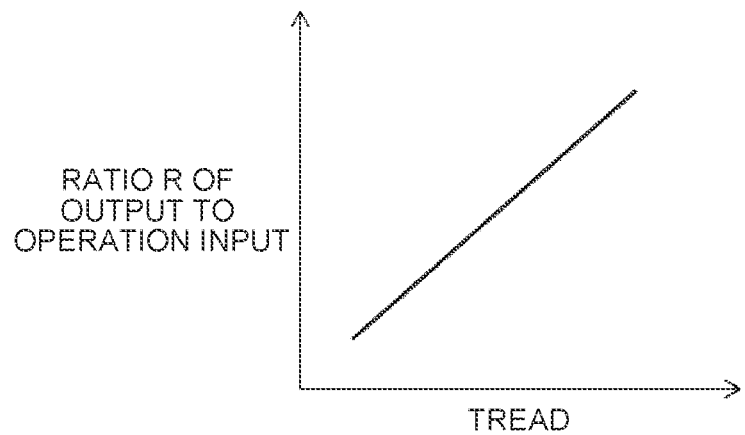
FIG. 12 is a graph showing the relationship between the output characteristic that is selected for remote driving and the tread in a third reference example.
Figure 13:
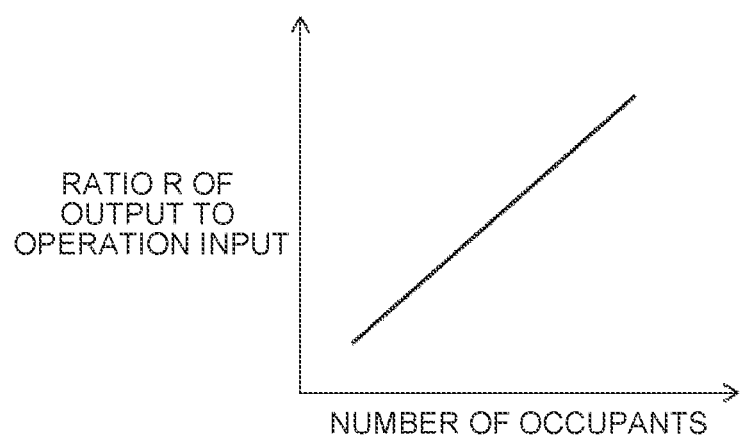
FIG. 13 is a graph showing the relationship between the output characteristic that is selected for remote driving and the number of occupants in a fourth reference example.
Figure 14:
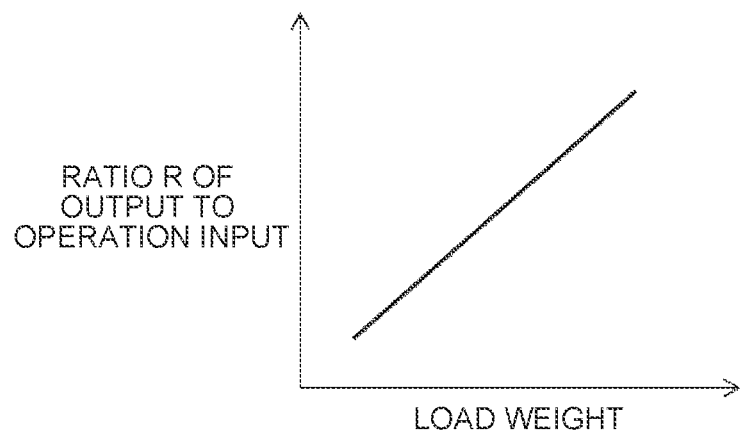
FIG. 14 is a graph showing the relationship between the output characteristic that is selected for remote driving and the load weight in a fifth reference example.

According to the setting shown in FIG. 12, the ratio R is higher in a vehicle with a large tread in the vehicle group than in a vehicle with a small tread in the vehicle group. According to the setting shown in FIG. 13, the ratio R is higher in a vehicle with a large number of occupants in the vehicle group than in a vehicle with a small number of occupants in the vehicle group. According to the setting shown in FIG. 14, the ratio R is higher in a vehicle with a large load weight in the vehicle group than in a vehicle with a small load weight in the vehicle group.

Instead of the first to fifth reference examples described above, the ratio R (output characteristic) for remote driving may be set to vary according to, for example, two or more of the parameters: vehicle weight, wheelbase, tread, number of occupants, and load weight.

Next, a sixth reference example that is independent of the first to fifth reference examples will be described. The sixth reference example is applied to a remote vehicle including a steering system capable of changing the ratio of the turning angle of the wheels to the rotation angle of the steering wheel (steering angle) like the steering system 12 shown in FIG. 1 (e.g., remote vehicle 10). For the vehicle including the steering system, the steering gear ratio is increased when a driver riding in the vehicle drives the vehicle. The steering angle can thus be changed significantly without requiring the driver to change his or her grip on the steering wheel. On the other hand, when the operator remotely drives the remote vehicle 10 while looking at the display 56, setting the steering gear ratio high as described above does not necessarily provide good operability for the operator.

Figure 15:
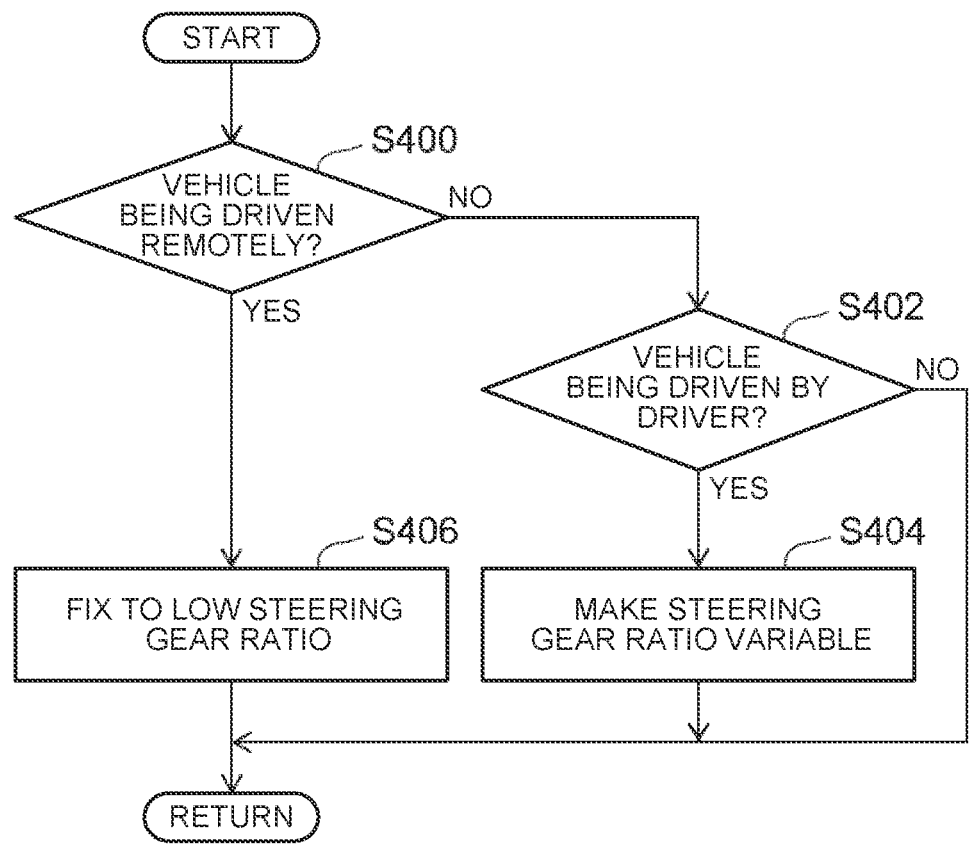
FIG. 15 is a flowchart showing an example of a process for setting a steering characteristic according to a sixth reference example.

FIG. 15 is a flowchart showing an example of a process for setting a steering characteristic according to the sixth reference example. In view of the above problem, in the sixth reference example, the steering characteristic is changed between remote driving and the non-remote driving (driving by a driver riding in the vehicle) by the process of the flowchart shown in FIG. 15.

In FIG. 15, when the routine is started, it proceeds to step S400, and the processor 18a of the in-vehicle ECU 18 determines whether the vehicle is being driven remotely. When the vehicle is not being driven remotely, the routine proceeds to step S402. In step S402, the processor 18a determines whether the vehicle is being driven by a driver riding in the vehicle.

When No in step S402 (that is, when the vehicle is being driven autonomously), the processor 18a ends the current process. On the other hand, when the vehicle is being driven by the driver riding in the vehicle in step S402, the routine proceeds to step S404. In step S404, the processor 18a controls the steering system 12 so as to change the steering gear ratio according to, for example, the vehicle speed and the steering angle. The processor 18a then returns to the start of the routine and performs control.

When the vehicle is being driven remotely in step S400, the routine proceeds to step S406. In step S406, the processor 18a controls the steering system 12 so that the steering gear ratio is fixed to a value equal to that of a typical vehicle that does not have a function to vary the steering gear ratio. The processor 18a then returns to the start of the routine and performs control.

According to the sixth reference example described above, while a driver riding in the vehicle is driving the vehicle, good operability is provided by making the steering gear ratio variable. During remote driving of the vehicle, however, the steering characteristic suitable for the remote driving is implemented by using a fixed steering gear ratio.

What is claimed is:

1. A remote driving device that remotely operates a vehicle, comprising:
    a remote operation device configured to be operated by an operator to remotely operate the vehicle;
    a reaction force unit configured to generate an operation reaction force to be applied to the remote operation device;
    a receiver configured to receive a parameter affecting vehicle characteristics of the vehicle from the vehicle; and
    a processor configured to control the reaction force unit so as to generate a magnitude of the operation reaction force according to the received parameter, wherein
    the parameter includes a wheelbase of the vehicle; and
    the processor is further configured to control the reaction force unit so as to generate a greater operation reaction force when the wheelbase is longer compared to the operation reaction force when the wheelbase is shorter.

2. The remote driving device according to claim 1, wherein:
    the parameter includes a weight of the vehicle; and
    the processor is configured to control the reaction force unit so as to generate a greater operation reaction force when the weight is larger compared to the operation reaction force when the weight is smaller.

3. The remote driving device according to claim 1, wherein:
    the parameter includes a tread of the vehicle; and
    the processor is configured to control the reaction force unit so as to generate a greater operation reaction force when the tread is larger compared to the operation reaction force when the tread is smaller.

4. The remote driving device according to claim 1, wherein:
    the parameter includes a number of occupants in the vehicle; and
    the processor is configured to control the reaction force unit so as to generate a greater operation reaction force when the number of occupants is larger compared to the operation reaction force when the number of occupants is smaller.

5. The remote driving device according to claim 1, wherein:
    the parameter includes a weight of a load carried by the vehicle; and
    the processor is configured to control the reaction force unit so as to generate a greater operation reaction force when the weight of the load is larger compared to the operation reaction force when the weight of the load is smaller.

6. The remote driving device according to claim 1, wherein the processor is configured to control the reaction force unit so as to generate a greater operation reaction force when an abnormality related to traveling of the vehicle has occurred in the vehicle than when the abnormality is not present in the vehicle.

7. The remote driving device according to claim 1, wherein the remote operation device is at least one of the following components: a steering, an accelerator pedal, and a brake pedal.

8. A remote driving system, comprising:
    a vehicle; and
    a remote driving device that is configured to remotely operate the vehicle, wherein the vehicle includes a transmitter that sends a parameter affecting vehicle characteristics of the vehicle to the remote driving device, wherein the remote driving device includes a remote operation device, a reaction force unit, a receiver, and a processor, the remote operation device being configured to be operated by an operator to remotely operate the vehicle, the reaction force unit being configured to generate an operation reaction force to be applied to the remote operation device, the receiver being configured to receive the parameter from the vehicle, the processor of the remote driving device being configured to control the reaction force unit so as to generate a magnitude of the operation reaction force according to the received parameter, wherein the parameter includes a wheelbase of the vehicle, and wherein the processor of the remote driving device is further configured to control the reaction force unit so as to generate a greater operation reaction force when the wheelbase is longer compared to the operation reaction force when the wheelbase is shorter.

9. The remote driving system according to claim 8, wherein:

the vehicle includes a processor that is configured to determine whether the vehicle is being driven remotely; and the processor of the vehicle is configured to perform control in which a steering gear ratio of the vehicle is fixed while the vehicle is being driven remotely, and is configured to perform control in which the steering gear ratio is made variable while the vehicle is not being driven remotely.

* * * * *